(12) United States Patent
Tanaami et al.

(10) Patent No.: US 6,248,995 B1
(45) Date of Patent: Jun. 19, 2001

(54) CONFOCAL MICROSCOPIC EQUIPMENT

(75) Inventors: Takeo Tanaami; Shinya Otsuki; Yasuhito Kosugi; Nobuhiro Tomosada, all of Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/080,158

(22) Filed: May 15, 1998

(30) Foreign Application Priority Data

May 30, 1997 (JP) ...................................... 9-141215

(51) Int. Cl.[7] .............................. G01B 9/04; G01B 11/00; G01N 21/00
(52) U.S. Cl. .................... 250/234; 250/559.08; 250/235; 359/368; 348/79
(58) Field of Search .................................... 250/234, 235, 250/559.22, 559.29, 559.38, 559.06, 559.07, 559.08; 359/368, 385, 239; 348/79, 80

(56) References Cited

U.S. PATENT DOCUMENTS

| | | | |
|---|---|---|---|
| 5,428,475 | * | 6/1995 | Tanaami et al. ..................... 359/368 |
| 5,557,113 | * | 9/1996 | Moorhouse et al. ................. 382/255 |
| 5,680,484 | * | 10/1997 | Ohyama .......................... 250/559.38 |
| 5,760,950 | * | 6/1998 | Maly et al. ........................ 359/458.1 |
| 5,834,758 | * | 11/1998 | Trulson et al. .................... 250/201.2 |
| 5,839,445 | * | 12/1998 | Kaufman .............................. 128/898 |
| 5,932,872 | * | 8/1999 | Price ................................... 250/201.3 |

\* cited by examiner

Primary Examiner—John R Lee
(74) Attorney, Agent, or Firm—Moonray Kojima

(57) ABSTRACT

Confocal microscopic equipment that can photograph confocal images at high speed and with good signal to noise ratio, wherein the equipment obtains confocal images by rotating a disk having a plurality of apertures and by scanning a sample on which light beams passing through the apertures are focused; and comprising a light source, an optical microscope, a high speed camera that photographs confocal images, a high speed confocal scanner that scans a sample with an output light beam from the light source via the optical microscope, and outputs the return light from the sample to the high speed camera, and a memory that stores confocal images photographed with the high speed camera on a real time basis.

16 Claims, 5 Drawing Sheets

CONFOCAL MICROSCOPIC EQUIPMENT

BACKGROUND OF THE INVENTION

1. Field of Invention

This invention relates to confocal microscopic equipment; and more particularly, to such equipment that can provide confocal images at high speed.

2. Description of the Prior Art

Conventional confocal microscopic equipment provides confocal images by rotating a disk having a plurality of apertures and by scanning a sample by focusing light beams that pass through the apertures onto the sample. FIG. 1 shows a conventional confocal microscopic equipment, such as disclosed in Japan Unexamined Patent Application Hei 1-503,493 (1989), wherein light beam 100 from a laser is made incident on beam splitter 2 via polarizer 1. The light beam transmitted through beam splitter 2 is made incident on pinhole disk 3 wherein pinholes are provided as apertures. Light beams transmitted through each pinhole irradiate sample 6 via quarter wave plate 4 and objective lens 5. The return light beams from sample 6, such as reflected light beams, are made incident again on pinhole disk 3 via objective lens 5 and quarter wave plate 4. The light beams are made incident on pinhole disk 3 and are transmitted through each pinhole in disk 3 and are reflected by beam splitter 2 and are made made incident on camera 9 via analyzer 7 and relay lens 8. In addition, a confocal image is photographed by camera 9 and is displayed on the screen of monitor 10. Disk 3 is rotated by motor 11.

However, disadvantageously, the utilization efficiency of the quantity of light for the transmitted light or the reflected light is low in the just described system of FIG. 1. Only about 1% of the quantity of incident light is used. Thus, for example, if a confocal image is photographed at a video rate higher than 30 frames/second (that is in the order of milliseconds) a sufficient quantity of light cannot be obtained with a CCD camera or the like. Accordingly, with the prior art apparatus, the signal to noise ratio (S/N) of the photographed confocal image is not in an acceptable range.

SUMMARY OF THE INVENTION

Accordingly, an object of the invention is to overcome the aforementioned and other deficiencies and problems of the prior art.

Another object is to provide a confocal microscopic equipment that can photograph confocal images at high speeds and with good signal to noise ratio.

DETAILED DESCRIPTION OF THE PREFERRED EMBODIMENTS

Figure 1:
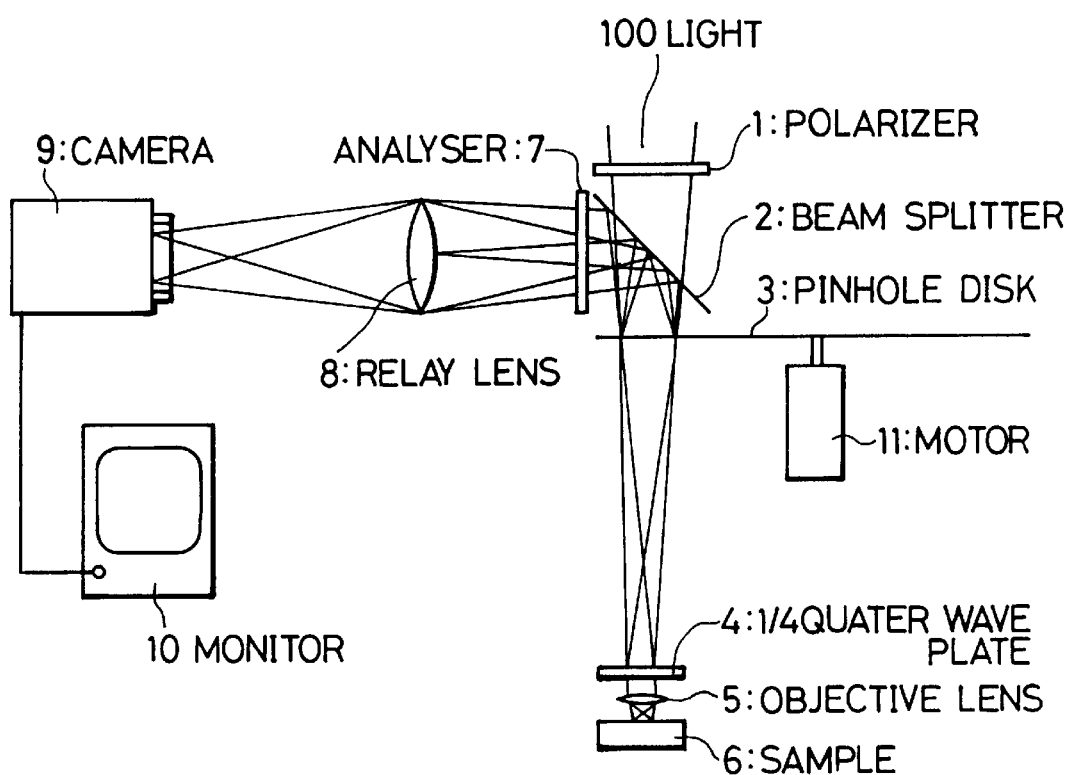
FIG. 1 is a block diagram depicting a conventional confocal microscopic equipment.
Figure 2:
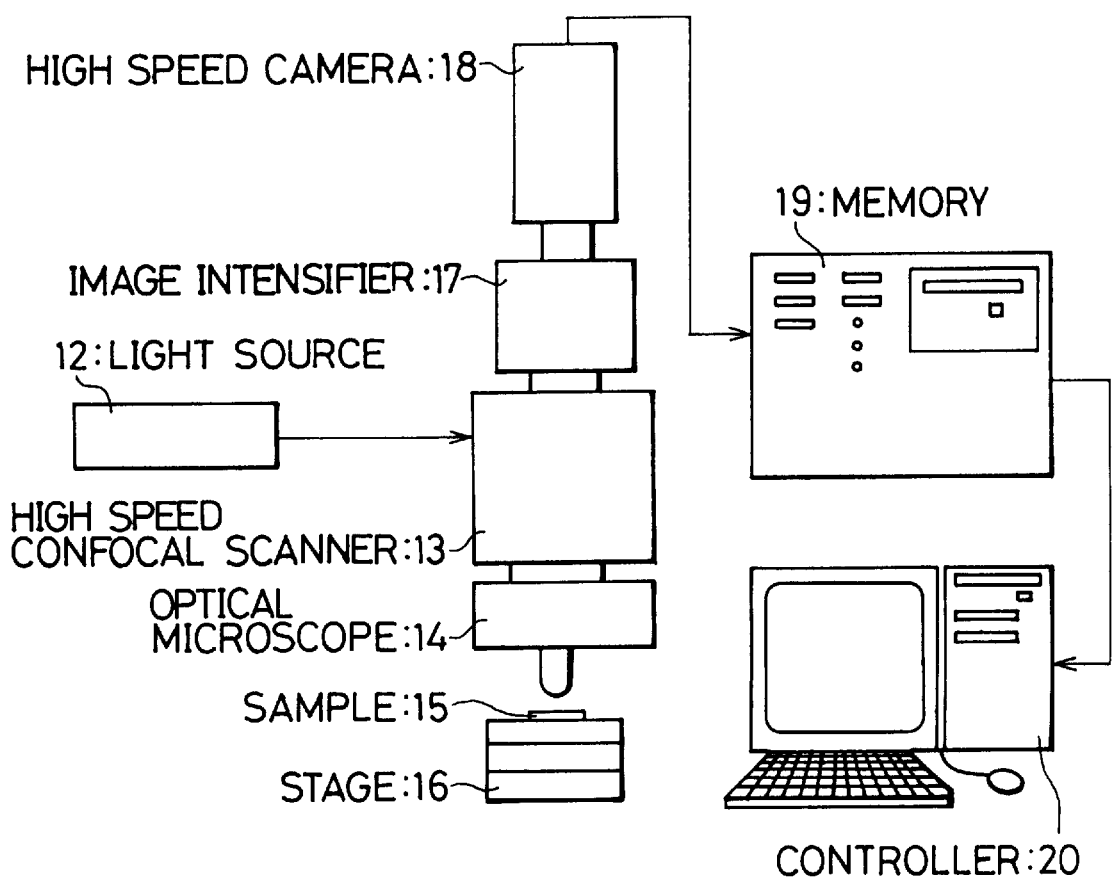
FIG. 2 is a block diagram depicting an illustrative embodiment of the invention.

FIG. 2 shows a confocal microscopic equipment, wherein an output light beam from light source 12, such as a laser, is made incident on high speed confocal scanner 13 to produce confocal images by rotating a pinhole disk and irradiates sample 15 via optical microscope 14. The return light beams from sample 15, such as reflected light beams, are made incident on high speed camera 18 via optical microscope 14, high speed confocal scanner 13, and image intensifier 17. An output signal from high speed camera 18 is supplied to memory 19 and an output signal from memory 19 is supplied to controller 20.

The operation of the embodiment is described with reference to FIG. 3, which shows a high speed confocal scanner 13 and optical microscope 14. Light beam 100a from light source 12 (see FIG. 2) is made incident on micro-lens disk 22 wherein a plurality of micro-lenses of the same pattern as the pinholes are provided as a focusing means. The light beams transmitted through the micro-lenses of disk 22 are focused on each pinhole of disk 21 via beam splitter 23 as a light branching means. The pinholes in pinhole disk 21 are apertures. The light beams that have passed through each pinhole of disk 21 are made incident on sample 15 via objective lens 25. The return light beams from sample 15, such as reflected light beams, are again made incident on pinhole disk 21 via objective lens 25, and the light beams that have passed through each pinhole of disk 21 are reflected back by beam splitter 23 and outputted via lens 24. In addition, disk 21 and disk 22 are rotated synchronously by a driving means 26, such as a motor.

Incident light 100a scans the surface of the sample 15 by passing through each micro-lens in disk 22 and through each pinhole in disk 21. Return light beams are reflected by the sample 15 and a confocal image thereof is obtained by photographing the return light beams.

As discussed, each micro-lens provided in disk 22 focuses the incident light beam 100a on each pinhole in disk 21 via beam splitter 23. The utilization efficiency of the incident light beam 100a is considerably improved by arranging pinholes at the focal points of the micro-lenses.

The output light beams from the high speed confocal scanner 13 (i.e. the light focused by lens 24 in FIG. 3) are made incident on image intensifier 17 of FIG. 2. The image intensifier 17 optically amplifies light beams having very small quantities of light. Thus, the output light beam from high speed confocal scanner 13 are optically amplified and then made incident on high speed camera 18. High speed camera 18 photographs the incident confocal image and stores the photographed confocal image in memory 19 as frame data.

When a three dimensional measurement is desired, controller 20 controls stage 16 to photograph the confocal image by scanning the sample 15 in the Z-axis (i.e. optical axis) direction and then causes the high speed camera 18 to photograph the confocal images of sample 15. A plurality of confocal images, which are slice images of the sample 15 in the Z-axis direction, are then stored in memory 19 on a real time basis.

Controller 20 carries out the scanning control and causes reconsrtuction of three dimensional solid images based on the frame data stored in the memory 19. A monitor, or the like, is then caused to display the three dimensional solid images.

The utilization efficiency of the incident light beam from the light source 12 is improved because each micro-lens of disk 22 focuses the incident light beam on each pinhole of disk 21 via beam splitter 23. In addition, advantageously, photographing confocal images at high speeds and with good S/N ratio becomes possible using the high speed camera 18 by optical amplification of the output light beams from the high speed confocal scanner 13 using the image intensifier 17. Thus, confocal images photographed at high speed is stored in memory 19 on a real time basis. Also, three dimensional solid images can be readily reconstructed based on the frame data stored in the memory 19.

Figure 4:
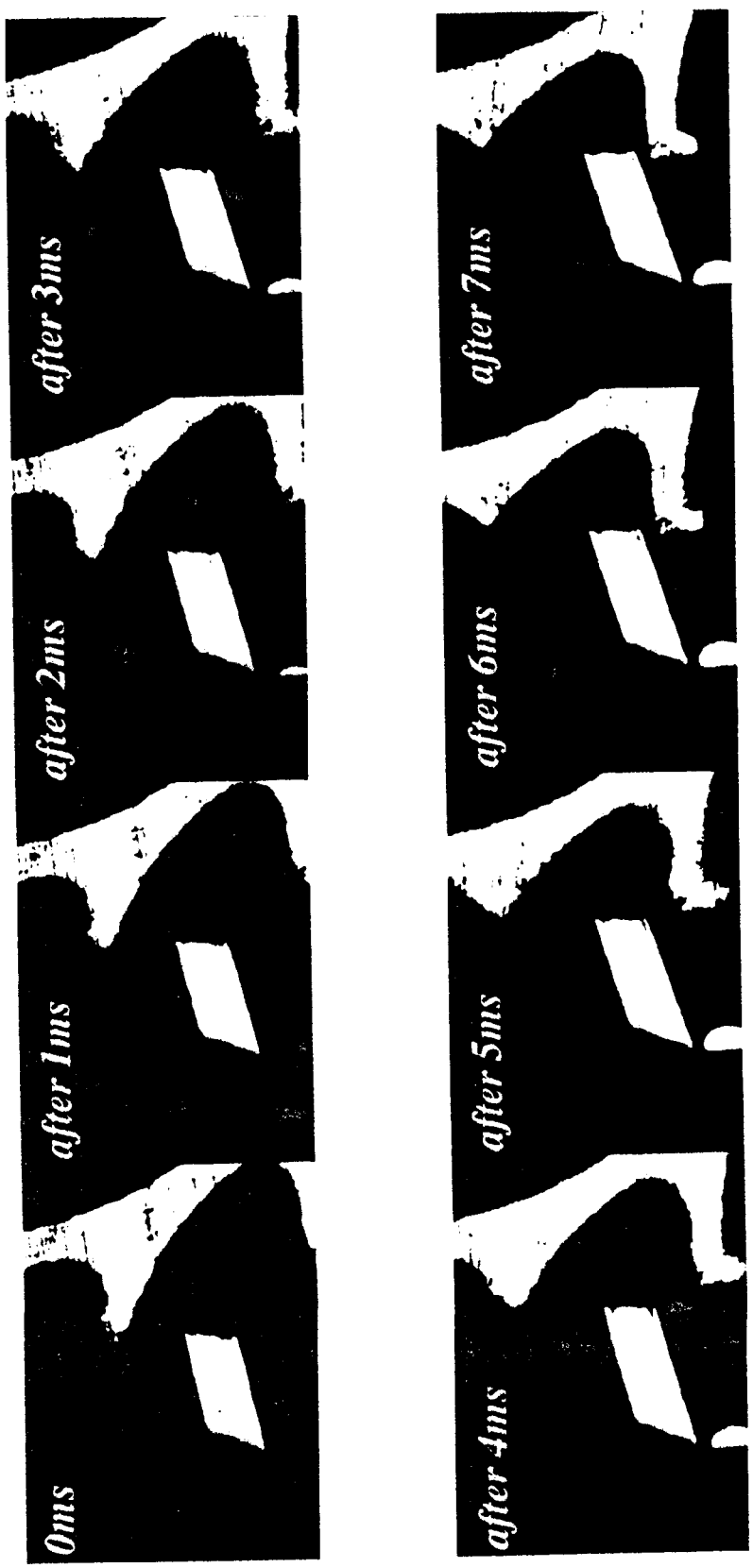
FIG. 4 is a series of photographs depicting confocal images photographed by the invention.

FIG. 4 shows an example of a plurality of photographs of a confocal image taken serially at times 0 ms, 1 ms, 2 ms, 3 ms, 4 ms, 5 ms, 6 ms, and 7 ms. The photographs show the state of a minute gear rotating at high speed synchronously with a ratchet, with the successive frames being take every 1 ms for 8 frames.

Figure 5:
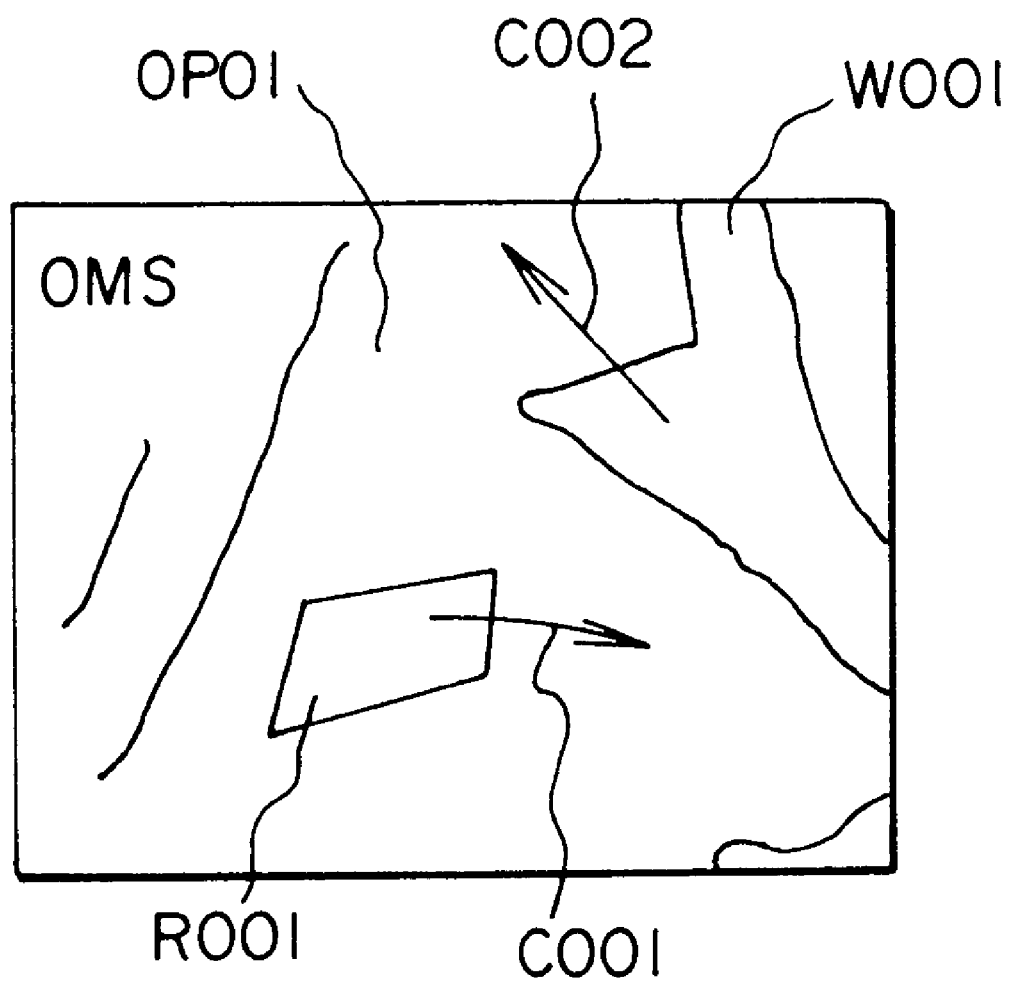
FIG. 5 is a sketch of the first photograph frame of FIG. 4 used to explain the invention results.

FIG. 4 can be better understood by referring also to FIG. 5 which is an outline sketch of the FIG. 4 photograph taken at 0 ms with explanatory arrows shown therein. FIG. 5 shows a gear W001 and a ratchet R001 moving in the directions shown by arrows C001 and C002, respectively. Another part located in the place shown by designation 0P01 does not appear in the photograph. However, since the position of 0P01 in the direction of depth (i.e. the optical direction) is different from those of the gear W001 and ratchet R001 the image of the other part does not appear in the photograph of the confocal image, as shown in FIG. 4. In other words, advantageously, and unexpectedly, the invention produces a confocal image of the sample moving at high speed on a real time basis. In addition, although a laser is used as the light source 12 in FIG. 2, a white light source, can be also used as the light source.

Figure 3:
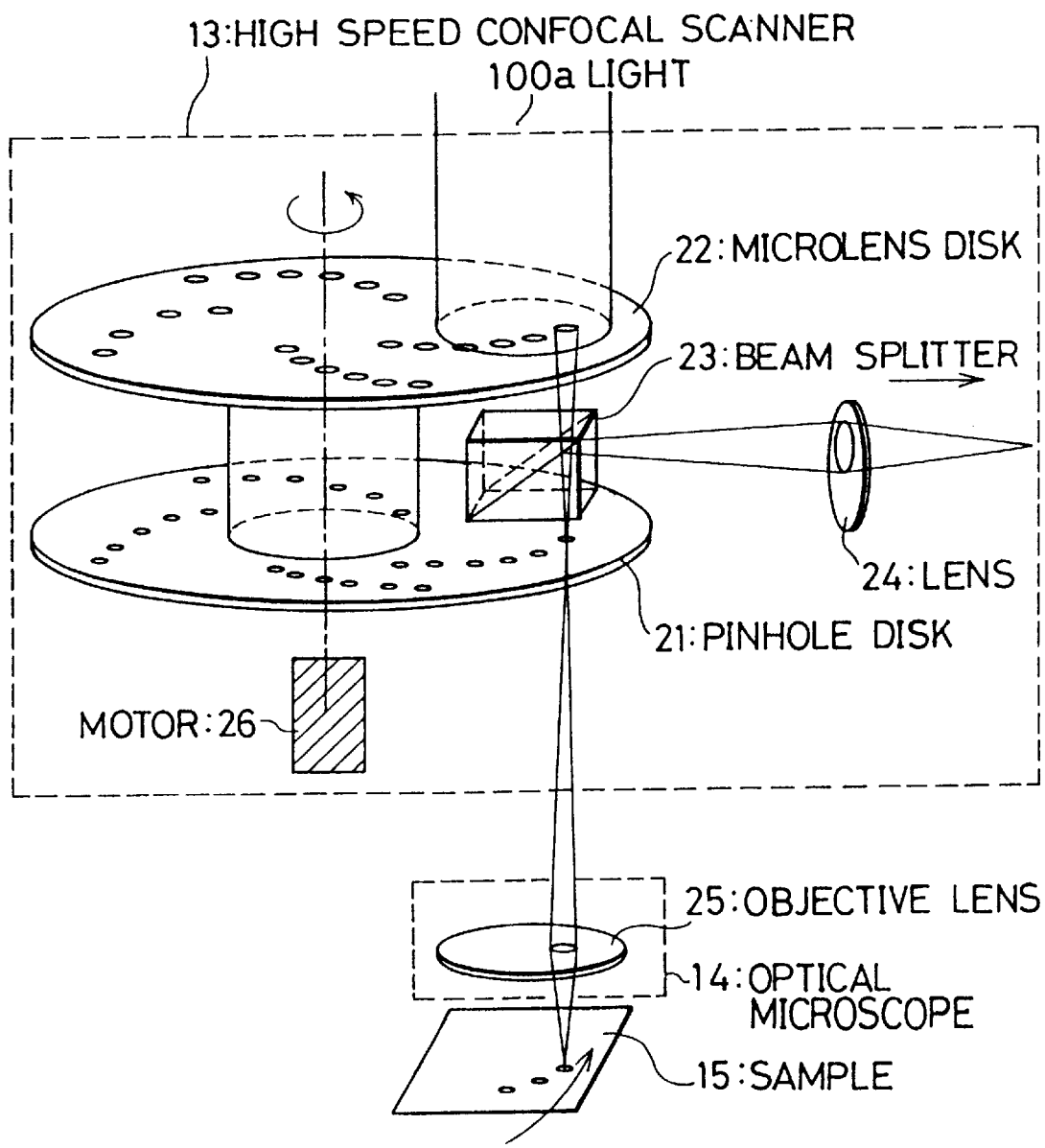
FIG. 3 is a pictorial view depicting a high speed confocal scanner.

Furthermore, although one objective lens 25 is shown in FIG. 3, as an example of the optical microscope 14, a plurality of objective lenses, having different magnifications, such as 4,10,20,40, 100, etc, may be used. Also, although an image intensifier 17 is provided to optically amplify the quantity of the output light from the high speed confocal scanner 13, the image intensifier 17 may be omitted if sufficient quantity of light for high speed photography by the high speed camera 18 is provided. Moreover, although stage 16 is used to scan sample 15 in the Z-axis direction, the objective lens 25 of microscope 14 may be used to scan in the Z-axis direction.

In FIG. 2, a reflective object which reflects the irradited light is used as sample 15. However, the invention can also be used with other types of sample surfaces, such as a fluroscent sample, for example an organism. In other words, fluroscent samples can be observed by taking in fluorescence generated by the irradiated light using the optical microscope 14, or the like.

When reconstruction of the three dimensional solid image is not required, part of the functions of the controller 20 may be omitted As an alternative, memory 19 can also be integrated into controller 20 by utilizing a memory in a computer.

The invention advantageously provides a confocal microscopic equipment which improves the utilization efficiency of the incident light from the light source. This is due to each micro-lens located in a disk focuses the incident light beam on each pinhole of a disk via a beam splitter. In addition, advantageously, by optically amplifying the output light beams from a high speed confocal scanner with an image intensifier, high speed photography with a high speed camera is made possible by the invention and confocal images photographed at high speeds can be stored in a memory on a real time basis. Moreover, advantageously, three dimensional solid images can be readily reconstructed by the invention based on the frame data stored in the memory.

The foregoing description is illustrative of the principles of the invention. Numerous extensions and modifications thereof would be apparent to the worker skilled in the art. All such extensions and modifications are to be construed to be within the spirit and scope of the invention.

What is claimed is:

1. In a confocal microscopic equipment that obtains optical confocal images by rotating a disk having a plurality of apertures and by scanning a sample by focusing light beams that pass through said apertures on said sample, said equipment comprising:
   a light source;
   an optical microscope;
   a high speed camera to photograph said optical confocal images; and
   a high speed confocal scanner that scans said sample with output beams from said light source via said optical microscope and that outputs return light beams from said sample to be photographed by said high speed camera; the improvement comprising:
   said high speed confocal scanner comprising:
      a first planar disk having a plurality of micro-lens focusing means to which an incident beam is applied;
      a second planar disk having a corresponding plurality of apertures of the same pattern as said micro-lens focusing means and disposed to be parallel to said first planar disk so that a corresponding micro-lens focusing means focus light on a corresponding aperture;
      a beam splitter positioned between the parallel positioned said first planar disk and said second planar disk that transmits light beams transmitted through said first planar disk micro-lens focusing means and reflects return light beams from said apertures of said second planar disk;
      a lens that focuses and outputs reflected light beams from said beam splitter; and
      driving means that rotates said first planar disk and said second planar disk synchronously with each other so that corresponding micro-lens focusing means and apertures are synchronously rotated together; and
   a memory that stores as actual optical frame data a plurality of optical confocal images photographed with said high speed camera on a real time basis; and wherein said high speed camera operates at a rate higher than 30 frames per second.

2. The equipment of claim 1, further comprising an image intensifier disposed between said high speed confocal scanner and said high speed camera.

3. The equipment of claim 2, wherein said light source is a laser.

4. The equipment of claim 2, wherein said light source is a source of white light.

5. The equipment of claim 2, further comprising objective lenses having a plurality of magnifications.

6. The equipment of claim 1, further comprising a stage for scanning said sample in an optical axis direction.

7. The equipment of claim 6, wherein said light source is a laser.

8. The equipment of claim 6, wherein said light source is a source of white light.

9. The equipment of claim 6, further comprising objective lenses having a plurality of magnifications.

10. The equipment of claim 1, further comprising a controller to reconstruct a three dimensional solid image based on a plurality of confocal images stored in said memory.

11. The equipment of claim 10, wherein said light source is a laser.

12. The equipment of claim 10, wherein said light source is a source of white light.

13. The equipment of claim 10, further comprising objective lenses having a plurality of magnifications.

14. The equipment of claim 1, wherein said light source is a laser.

15. The equipment of claim 1, wherein said light source is a source of white light.

16. The equipment of claim 1, further comprising objective lenses having a plurality of magnifications.

* * * * *